July 27, 1965  R. M. DE WEESE  3,197,212
RECORD CHANGER

Filed March 4, 1963  8 Sheets-Sheet 1

INVENTOR.
Ralph M. DeWeese
By
Hofgren, Wegner, Allen, Stellman & McCord
Attys

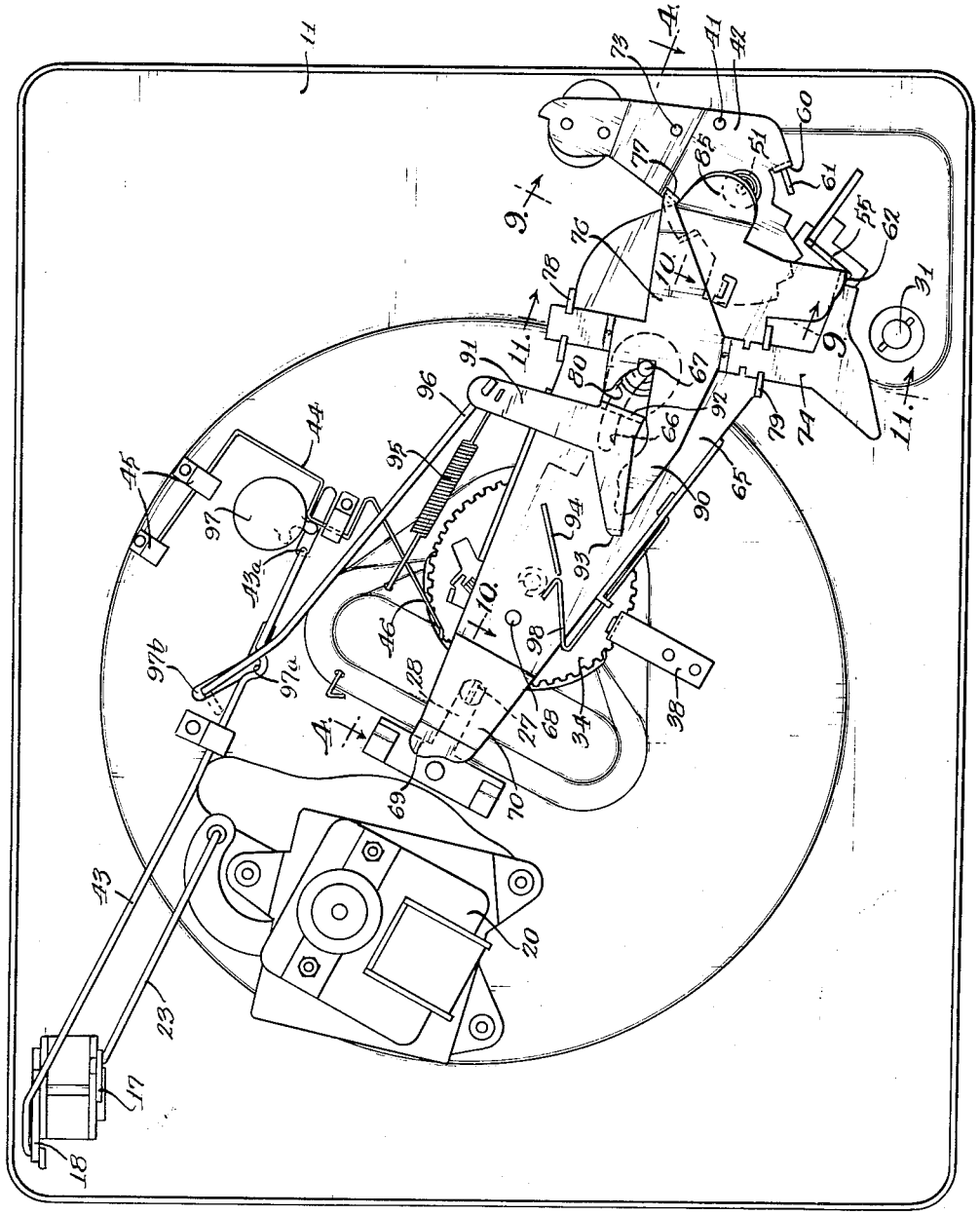

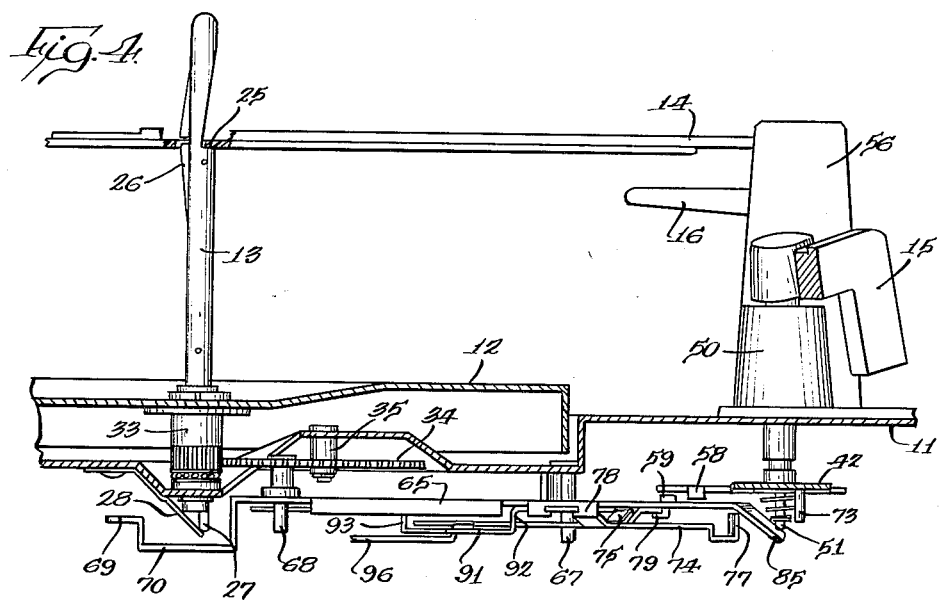
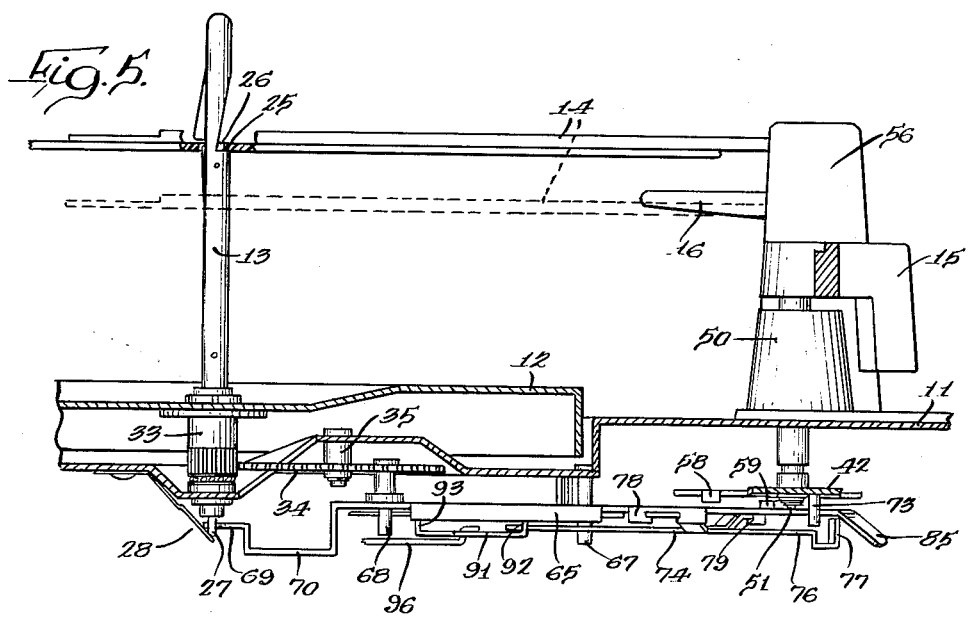

July 27, 1965 R. M. DE WEESE 3,197,212
RECORD CHANGER
Filed March 4, 1963 8 Sheets-Sheet 4
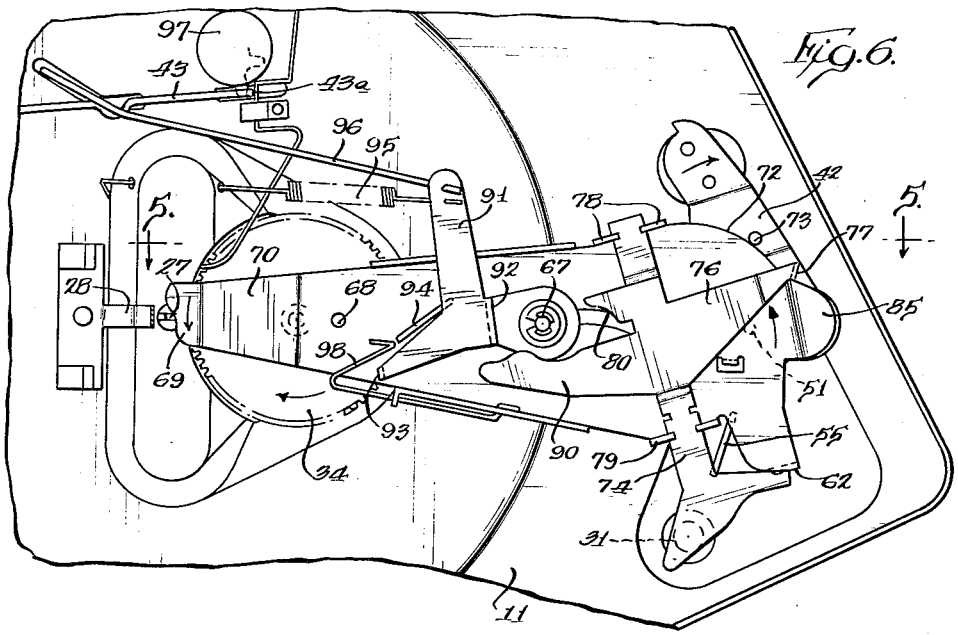
Fig. 6.
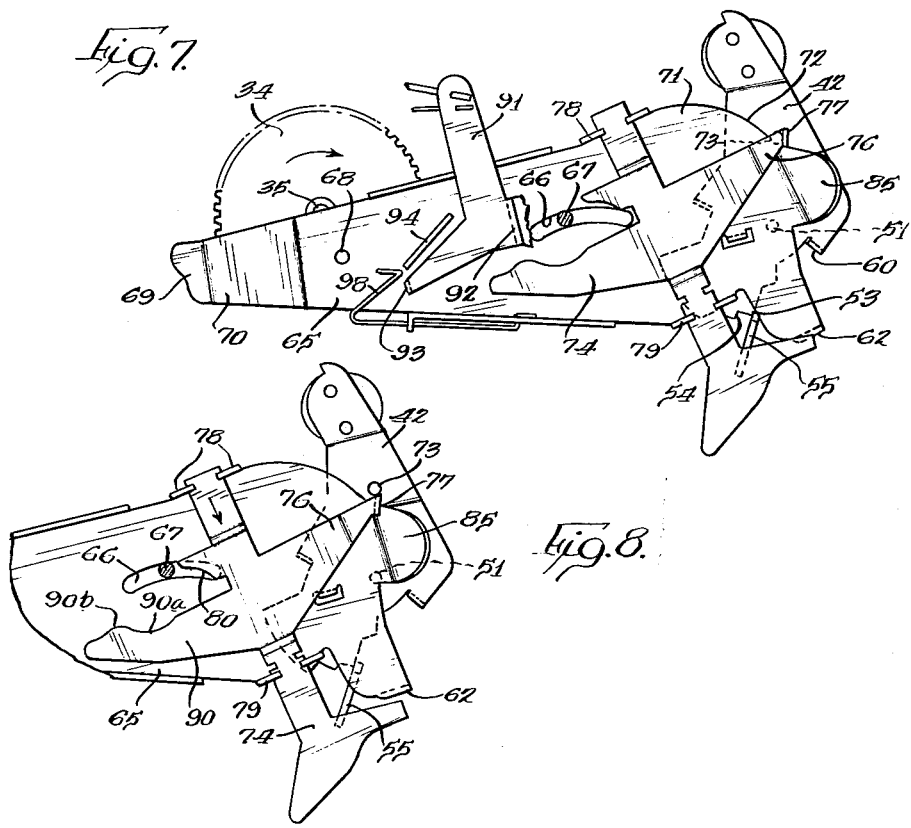
Fig. 7.
Fig. 8.

July 27, 1965  R. M. DE WEESE  3,197,212
RECORD CHANGER
Filed March 4, 1963  8 Sheets-Sheet 6

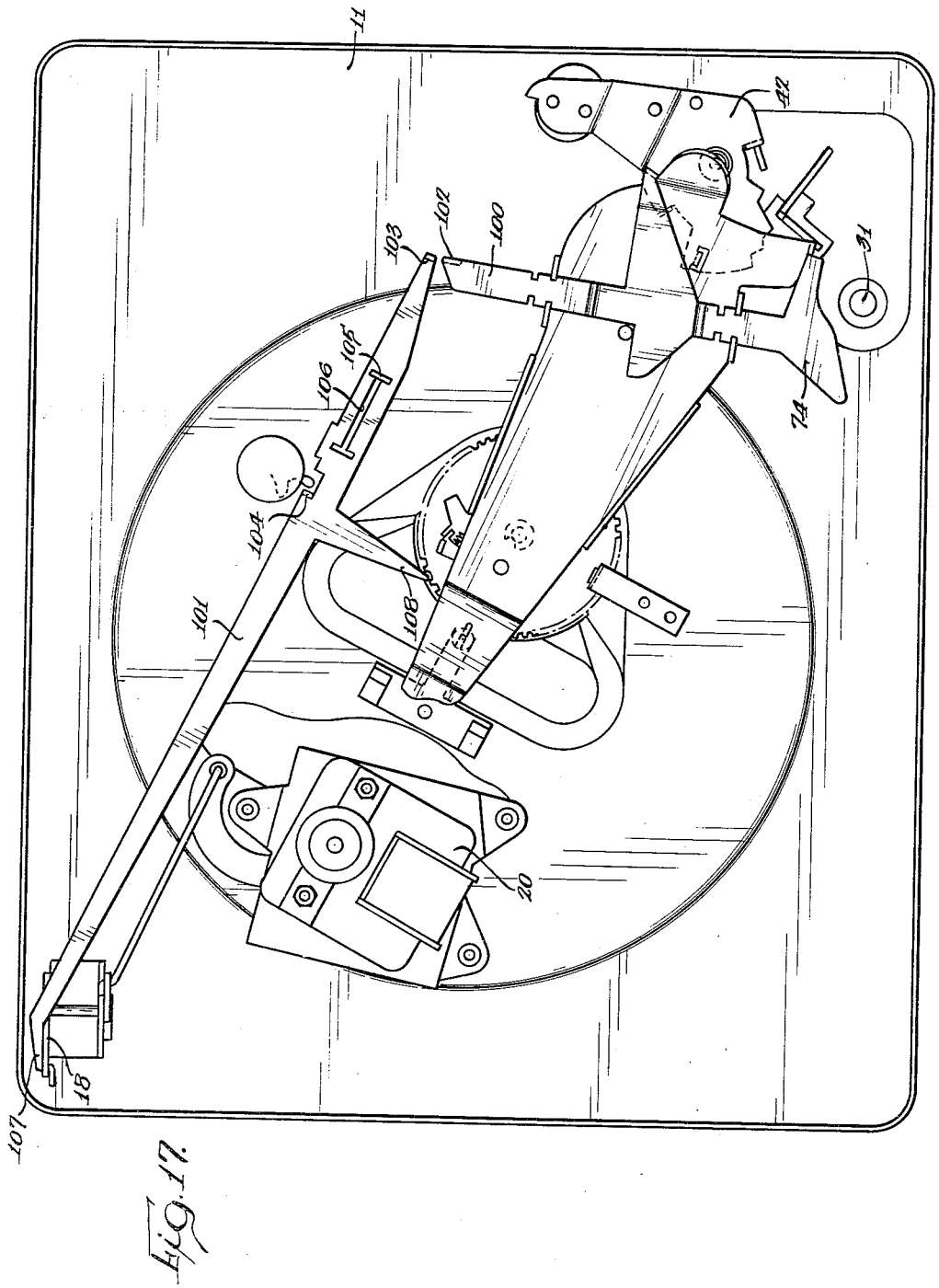

United States Patent Office 3,197,212
Patented July 27, 1965

3,197,212
RECORD CHANGER
Ralph M. De Weese, Antioch, Ill., assignor to Warwick Electronics Inc., a corporation of Delaware
Filed Mar. 4, 1963, Ser. No. 262,432
16 Claims. (Cl. 274—10)

This invention relates to a record changer and, more particularly, to a record changer having a minimum number of parts with unique movements for performing all the necessary operations.

An object of this invention is to provide a new and improved record changer.

Another object of this invention is to provide a record changer having a main operating member for operating the changer components through a change cycle in which the member is moved through a closed circuit with a part thereof having two distinct paths of travel with a return inward path different from a first outward path in order to avoid contact with structure in the outward movement while contacting such structure on the inward movement and thereby avoiding the utilization of parts arranged to engage structure but which act in one direction of the operating member movement and not in the other direction.

Still another object of the invention is to provide a record changer in which the operating member is powered for both rotational and linear movement to have one end thereof travel in a generally parabolic path with parts thereof operative in the outward direction of movement of the member and not operative upon inward movement, and with still other parts operative upon inward movement of the operating member.

A further object of the invention is to provide a record changer having an operating member for the change cycle which is given both linear and rotary movement and mounts a cross slide thereon which is movable relative to the operating member with the outward movement of the operating member carrying a part of the cross slide to a position for engagement with a set down cam operatively connected with the tone arm to return the tone arm to a set down position, as determined by the size sensing mechanism for the changer, and the cross slide being shiftable when the tone arm reaches set down position to release the engagement thereof with the set down cam, and means for restoring the cross slide to its initial position during the last part of the change cycle.

Another object of the invention is to provide a record changer as defined in the preceding paragraph in which the cross slide is shifted relative to the actuating member during a last record shut off operation to a position to avoid engagement with the set down cam and is powered to engage and move a member operatively associated with the power switch for the changer to shut off the changer during the last part of the movement of the actuating member in the cycle.

Further objects and advantages will become apparent from the following detailed description taken in connection with the accompanying drawings in which:

FIG. 3 is a bottom plan view of the record changer with the parts shown in normal play position;

FIG. 4 is a fragmentary vertical section taken generally along the line 4—4 in FIG. 3 with the tone arm (broken away) over the turntable;

FIG. 5 is a view similar to FIG. 4 and taken along the line 5—5 in FIG. 6 with the parts shown in a position approximately half-way through a record changing cycle;

FIG. 6 is a fragmentary bottom plan view similar to FIG. 3 showing the position of the parts with the tone arm almost in its outer position and prior to dropping a record onto the turntable;

FIG. 7 is a view similar to FIG. 6 showing the parts further along in the cycle of operation with the tone arm positioned to set down for a twelve-inch record;

FIG. 8 is a fragmentary view similar to FIG. 7 showing the parts in a further position during the cycle in which the tone arm has been released for inward record tracking movement;

FIG. 17 is a view similar to FIG. 3 showing an alternate form of last record shut off mechanism.

Figure 1:
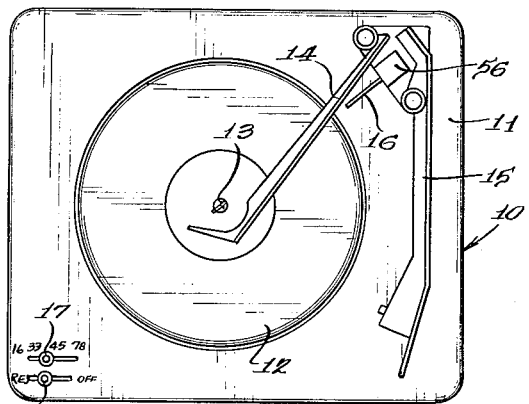
FIG. 1 is a plan view of the record changer.

While this invention is susceptible of embodiment in many different forms, there is shown in the drawings and will herein be described in detail an embodiment of the invention together with a modification thereof with the understanding that the present disclosure is to be considered as an exemplification of the principles of the invention and is not intended to limit the invention to the embodiments illustrated. The scope of the invention will be pointed out in the appended claims.

The changer, as shown in the drawings, is indicated generally at 10 and comprises a motorboard 11 rotatably mounting a turntable 12 having an upstanding spindle 13 for supporting records with a record hold down arm 14 pivotally and vertically movably mounted at a corner of the motorboard. A tone arm 15 is also pivotally mounted relative to the motorboard for movement between a rest position shown in FIG. 1 and a position overlying a record on the turntable. Record size-sensing mechanism, including a feeler 16, is also mounted on the motorboard 11. Operating controls for the changer are associated with the motorboard, including a manually operable member 17, for determining the speed of rotation of the turntable, and another manually operable member 18 for turning power on or off and also causing the changer to operate through a reject cycle.

The drive mechanism for the turntable is conventional and embodies a motor 20 (FIG. 3) driving through a stepped motor shaft 21, and an idler pulley 22 which engages the rim of the turntable 12. The idler wheel 22 is adjustable along steps on the motor shaft 21 for providing the desired speed of rotation of the turntable with the position determined by operating member 17, which is connected to the motor shift mechanism by a link 23, as known in the art.

An additional part of the changer, which is of conventional construction, is the record spindle 13 which is secured to the motorboard 11 and extends upwardly through the center of the turntable 12. This spindle has a shelf 25 for supporting a stack of records and a record ejecting lever 26 for ejecting the lowermost record of the stack off the shoulder so that it may move downwardly by gravity onto the turntable. The lower part of the record eject lever is indicated at 27 in FIG. 5 and extends beneath the spindle to be engaged by a spring 28 which urges the lever to an upper pivotally retracted position. The eject lever 27, when actuated by mechanism to be subsequently described, is caused to pivot from the position shown in FIG. 4 in a clockwise direction to eject a record off the shelf 25.

Figure 9:
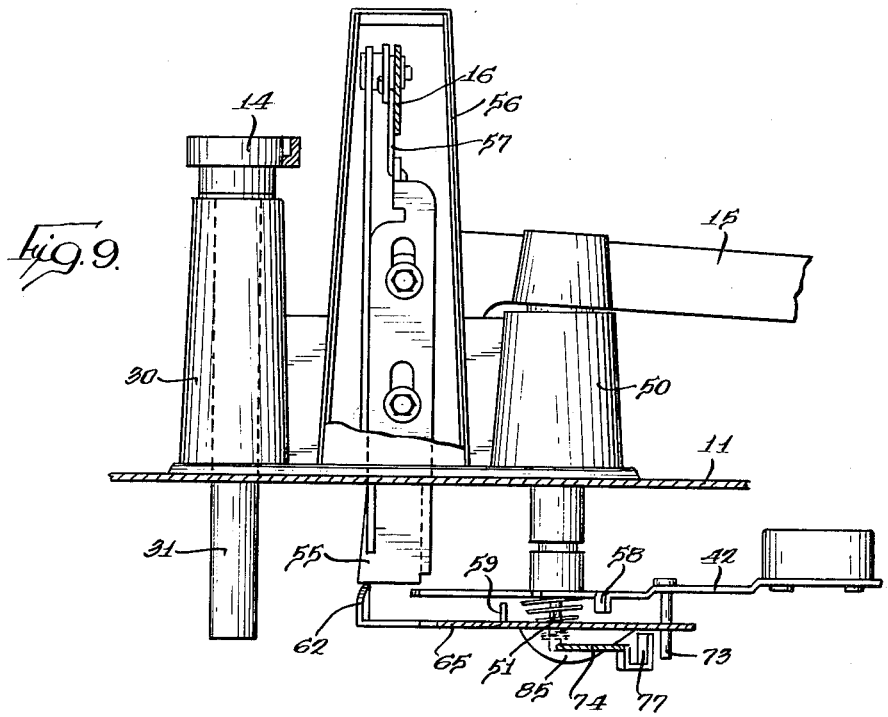
FIG. 9 is a vertical section on a further enlarged scale taken generally along the line 9—9 in FIG. 3.

Coacting with the spindle 13 to hold a stack of records on the shelf 25 is the hold down arm 14 which has a hold down position as shown in FIG. 4. This arm may move vertically higher if there are a greater number of records on the stack with the lowest position of the hold down arm, when no records are in the stack, being shown in broken line in FIG. 5. This position of the hold down arm is relied upon to initiate the last record shut off cycle subsequently to be described. The hold down arm 14 is supported relative to the motorboard within a post 30 by means of a pin 31 fitted within the post, and as shown in FIG. 9, the pin extends a substantial distance beneath the motorboard when no record stack is present.

Figure 2:
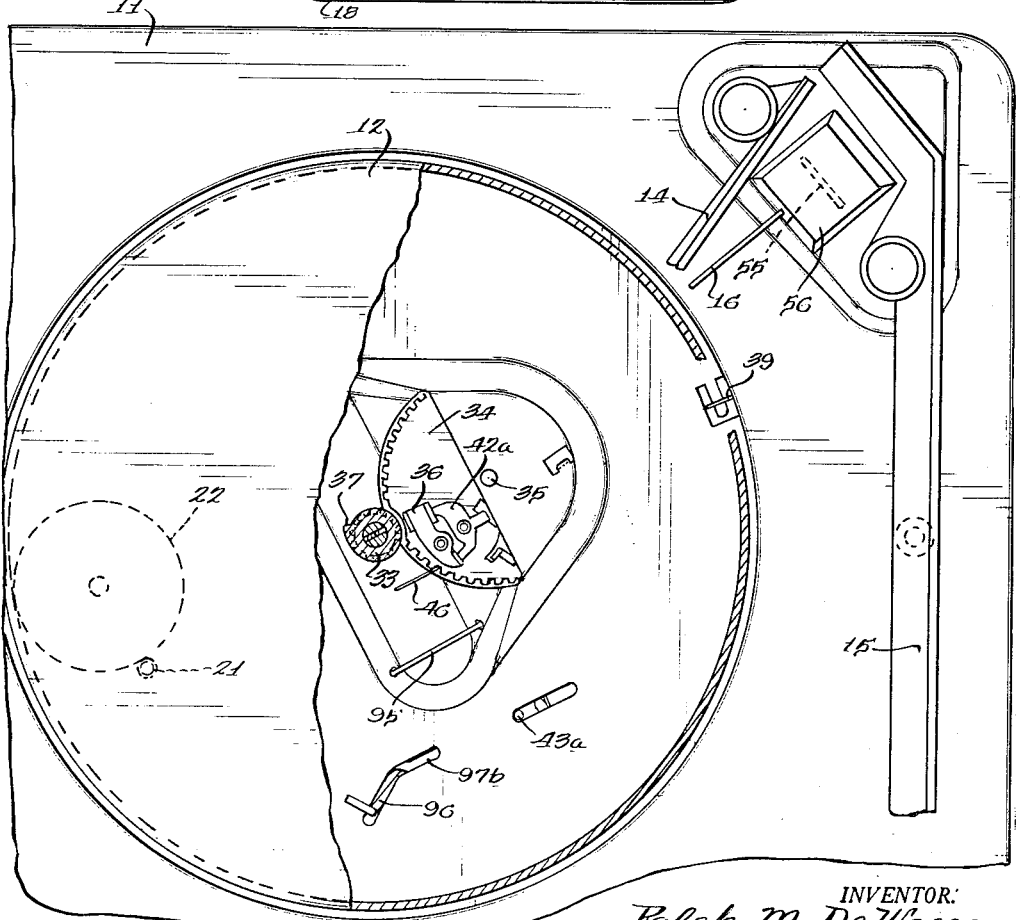
FIG. 2 is a view similar to FIG. 1 on an enlarged scale and with parts broken away.
Figure 16:
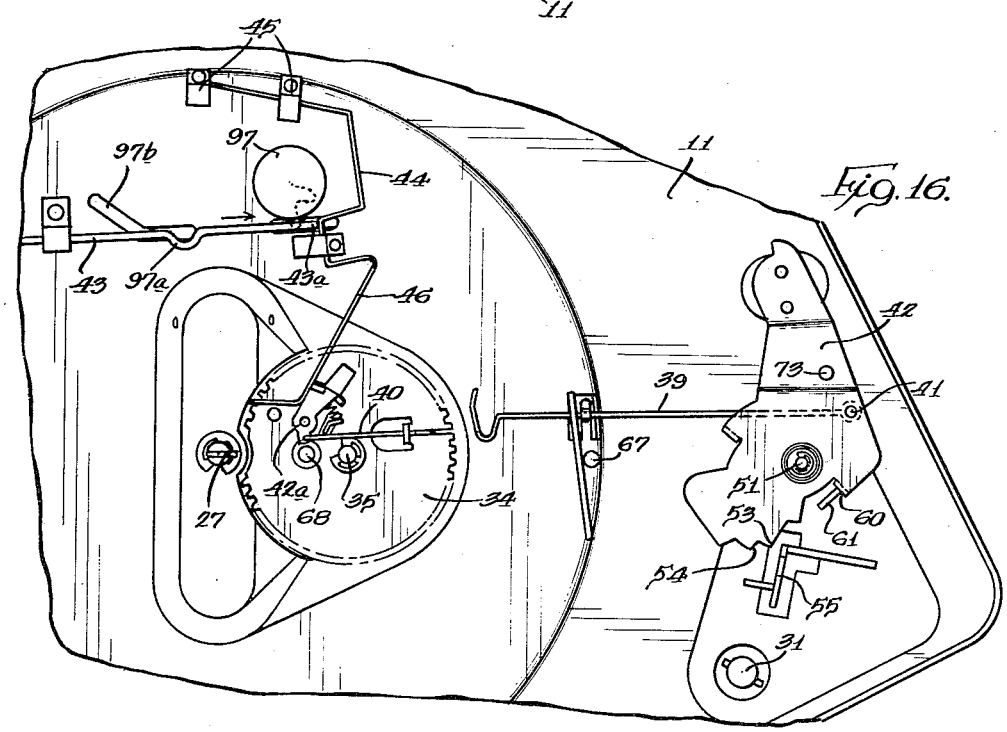
FIG. 16 is a fragmentary bottom plan view showing the parts in the off position.

The velocity trip mechanism for initiating the drive for a record change cycle is also of a generally conventional nature and is shown in FIGS. 2 and 16. The drive for a change cycle is derived from a sleeve 33 (FIGS. 2, 4, and 5) secured for rotation with the turntable which makes engagement with a change cycle gear 34 during a change cycle. The gear 34 is rotatably mounted on the motorboard by means of a pin mounting 35 and has a recessed portion not engaging with the gear on sleeve 33 during non-operation of the change cycle mechanism.

In order to initiate the cycle, a drive dog 36 of the trip mechanism, which is pivotally mounted on the gear 34, is moved into engagement with a shoulder 37 on the sleeve 33 to initiate rotation of the gear 34 and bring gear 34 into mesh with the sleeve gear. This also releases a spring detent 38 from engagement with a notch in the gear 34 with the detent again snapping into position of engagement with the gear at the end of a change cycle and having a cam-shaped end to move the gear into home position. The drive dog 36 is operated through a link 39 (FIG. 16) which engages a wire 40 linearly movable on the gear 34. This engagement occurs in each revolution of the turntable due to the connection of the wire 39 by means of a pin 41 with a set down cam 42, which is movable with the tone arm 15. The wire 40 is connected to a pivotal member 42a which engages the drive dog 36. When short increments of movement are imparted thereto, the drive dog 36 is not shifted sufficiently to engage the shoulder 37, but is swept back by a curved part of the sleeve adjacent the shoulder. When the throw imparted to the wire 39 is sufficient, the drive dog 36 is positioned to be engaged by the shoulder 37, and the rotation of the gear 34 commences.

The foregoing trip action can also occur by operation of the manually operated member 18 which is connected to a rod 43 (FIG. 3) having an end 43a positioned for engagement, when the rod is shifted toward the right, as viewed in FIG. 3, with a piano wire spring 44. The spring 44 is secured to the underside of the motorboard by clips 45 and has a movable end 46 positioned adjacent the pivoted member 42a of the velocity trip mechanism to which the previously referred to wire 40 is also connected. Thus, when the operating member 18 is moved in one direction, the rod 43 is shifted causing movement of the wire 44 to the right as viewed in FIG. 16, to initiate a change cycle and, incidentally, reject a record that may be playing at the time.

The tone arm 15 is rotatably mounted on a post 50 extending upwardly from the motorboard 11 and is also movable in elevation in a generally conventional manner by means of actuation of a vertically movable pin 51 (FIG. 4) which engages under the tone arm to raise the tone arm, when it is elevated, to the position shown in FIG. 5.

The set down cam 42, previously referred to, is rotatable with the tone arm 15 and has a pair of notches 53 and 54, respectively (FIG. 7), for coacting with a positioning member 55 of the size-sensing mechanism which is vertically positioned by the size-sensing member 16. This mechanism is mounted within a housing 56 secured to the motorboard. A linkage 57 connects the finger 16 with the member 55. If a seven-inch record is moved off the spindle shelf 25 for placement on the turntable, there is no engagement of the finger 16 and the member 55 stays in its uppermost position. If a ten-inch record is ejected, the finger 16 moves to an intermediate position to place the member 55 in a position to engage the shoulder 54 on the set down cam 42, while a twelve-inch record moves the sensing member 55 to the position shown in FIG. 7 in which the notch 53 is engaged by the member 55 to limit the movement of the tone arm 15. The seven-inch set down position of the tone arm is accomplished by a flange 58 (FIG. 9) on the set down cam 42 engaging a flange part 59 on the operating member to be described.

The outer limit of movement of the tone arm is determined by engagement of a surface 60 on the set down cam 42 with a fixed flange 61 on the motorboard (FIG. 16). The resetting of the size-sensing mechanism is accomplished by a cam surface 62 (FIG. 9) on the operating member which engages under the member 55 during the last part of the change cycle, as subsequently described.

The movements of the parts previously described in a record change cycle are derived from the power of the motor driving the turntable which drives the gear 34 to operate an operating member for the change cycle. This member is in the form of a plate 65 which has a generally arcuate slot 66 intermediate its ends which receives a pin 67 staked to the motorboard 11. The operating member 65 derives its movement from the gear 34 by means of a pin 68 fixed to the gear which engages with the operating member near one end thereof. One end of the operating member, as indicated at 69, has a generally circular path of movement from the rest position shown in FIG. 3 to a position ready for actuation of the record eject lever 26, as shown in FIG. 6.

The end 69 of the actuating member has a channel 70, as shown in FIG. 4, to provide space for the lower end 27 of the record eject lever during playing of a record. Further movement of the end 69 of the operating member is shown in FIG. 7 as the end 69 is beginning its return to the position of FIGS. 3 and 4.

The opposite end of the operating member 65, as indicated at 71, has a generally parabolic path of movement, thus defining two distinct paths of movement with the first outward path of movement of the member causing a surface 72 thereon to engage a pin 73 on the set down cam and move the tone arm outwardly to a position in which the flange 60 on the set down cam engages the stop lug 61 on the motorboard (FIG. 16).

Figure 10:
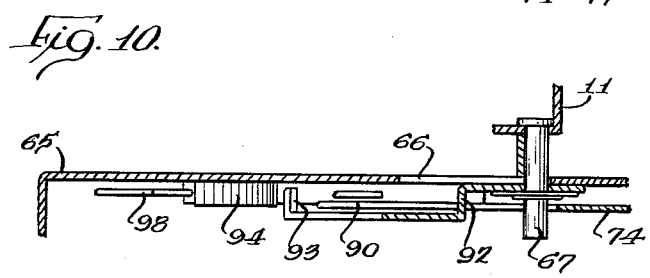
FIG. 10 is a fragmentary vertical section taken generally along the line 10—10 in FIG. 3.
Figure 11:
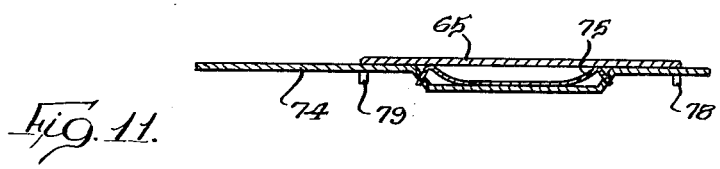
FIG. 11 is a vertical section taken generally along the line 11—11 in FIG. 3.
Figure 12:
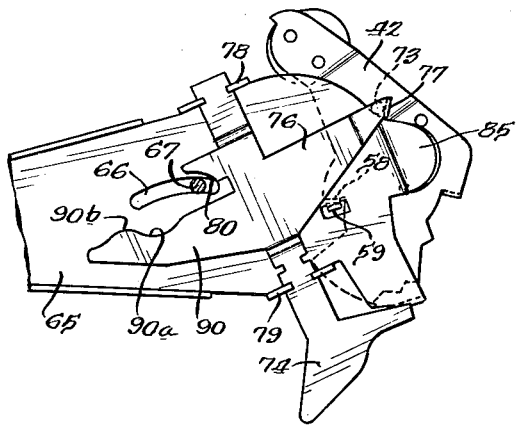
FIG. 12 is a view similar to FIG. 7 showing the parts positioned for set down of the tone arm at a seven-inch record position.

An auxiliary operating member in the form of a cross slide 74 is mounted on the operating member 65 (FIGS. 6, 10 and 11) with the position of the cross slide 74 on the operating member being yieldably held by a friction spring 75 engaging therebetween. This cross slide has an arm 76 provided with a sloped cam surface 77 which is positioned on the actuating member to travel in a path to avoid contact with the pin 73 on the set down cam in the first outward path of travel of the operating member 65, as shown in FIG. 6. With the generally parabolic movement of the end 71 of the operating member 65, the second path return movement of the operating member carries the sloped surface 77 on the cross slide to a position to engage behind the pin 73 on the set down cam 42 to move the set down cam and tone arm 15 inwardly. This inward movement continues until the set down position of the tone arm is reached, as determined by the sensing member 55, or by the seven inch stop members 58 and 59 (FIG. 9).

When one of the foregoing positions is reached, the sloped surface 77 functions to cam the cross slide 74 transversely of the operating member 65 to disengage the cross slide cam 77 from the set down cam pin 73 and permit retention of the tone arm in its set down position. This movement of the cross slide is permitted by the friction spring member 75.

The cross slide 74 is yieldably held to the operating member 65 by means of turned over guide flanges 78 and 79 formed on the operating member 65. This action of lateral shift of the cross slide 74 is shown in FIG. 8 in which the sloped surface 77 has just left the pin 73. In order to return the cross slide 74 to its normal position, a cam surface 80 is formed within a recessed part of the cross slide and engages with the pin 67 staked to the motorboard which fits within the arcuate slot 66 of the actuating member. This action is shown being initiated in FIG. 8 and completed with the cross slide restored to normal position, as shown in FIG. 3 at the end of a cycle.

Another action obtained by the general parabolic movement of one end of the operating member 65 is the non-conflicting path of movement for the resetting cam 62 at an end of the operating member 65. This resetting cam in the outward path of the movement of the operating member travels around the lower end of the size selecting member 55 and during the last part of the return movement of the operating member sweeps past the lower end of the sensing member for resetting thereof.

An additional function carried out by the operating member 65, is the action of a cam surface 85 at one end thereof coacting with the tone arm elevating pin 51, whereby on the outward movement of the operating member the cam surface 85 engages the pin 51 to cause raising thereof to the position shown in FIG. 5, and which holds the tone arm up until near the end of the change cycle in which the cam surface 85 moves away from the pin 51.

A last record shut off cycle is obtained by a different operation of the cross slide 74 and by additional mechanism shown in FIGS. 3, 6, 13, 14 and 15. After the playing of the last record, there are no more records on the shelf and the hold down arm 14 lowers to position the pin 31 at the level of the cross slide 74. This causes shift of the cross slide 74 upwardly, as viewed in FIG. 13, relative to the operating member 65 by continued movement of the operating member toward pin 31 (see FIG. 13). An offest 90a in an arm 90 of the cross slide permits this movement. This places the sloped surface 77 out of a possible engagement with the set down cam pin 73 (FIG. 14) and positions the arm 90 of the cross slide and particularly a cam surface 90b in position to engage a pivot arm 91 pivoted to the pin 67 which is staked to the motorboard.

Normally, the cross slide 74 does not make contact with the pivotally mounted arm 91. However, when the hold down shaft 31 is lowered, the shift of the cross slide brings the cross slide arm 90 into position to have surface 90b engage a flange 92 on the pivot arm. As the operating member 65 moves in its outward path of movement, the lateral shifting of the cross slide 74 causes the arm 90 thereof to push the pivot arm in a clockwise pivoting direction about the pin 67, as viewed in FIG. 13, and moves an end 93 of the pivot arm to one side of ramp flange 94 on the operating member 65. As the operating member 65 returns towards its rest position, the ramp flange 94 moves the pivot arm 91 further clockwise to tension a spring 95 and pull on a rod 96. As soon as the ramp flange 94 moves past the end 93 of the pivot arm, the spring 95 takes over to snap the pivot arm 91 back to its normal rest position and shift the rod 96 to the left which shifts the rod 43 to the left and causes an end thereof to operate the power switch 97 to turn off the charger. This occurs by an end of rod 96, guided by slot 97b, first being drawn into engagement with a notch 97a in the rod 43 and the spring 95 then shifts the rods 43 and 96 to the left as viewed in FIG. 15.

Figure 13:
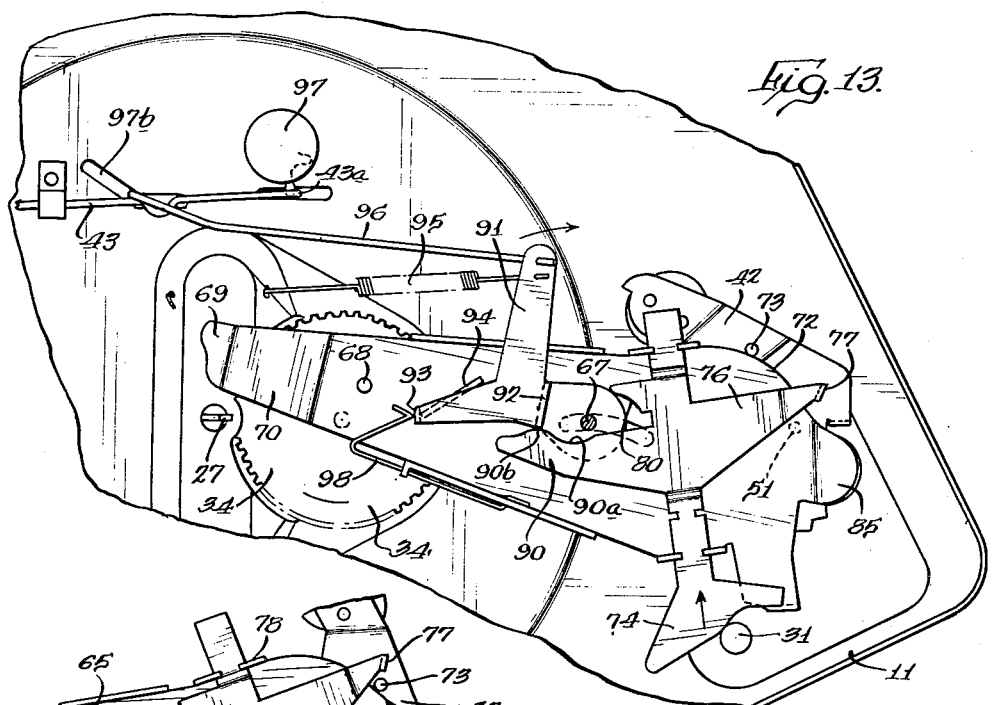
FIG. 13 is a view similar to FIG. 6 showing the parts positioned during the initial part of a last record shut off cycle.
Figure 14:
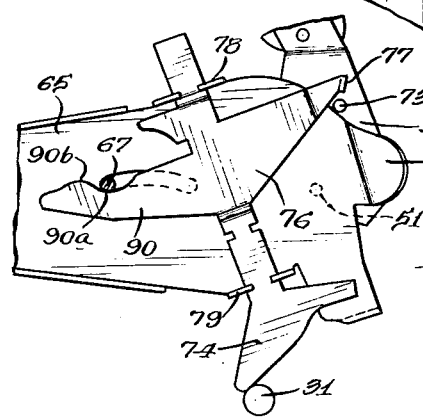
FIG. 14 is a fragmentary view similar to FIG. 13 showing the parts further along during the last record shut off cycle.
Figure 15:
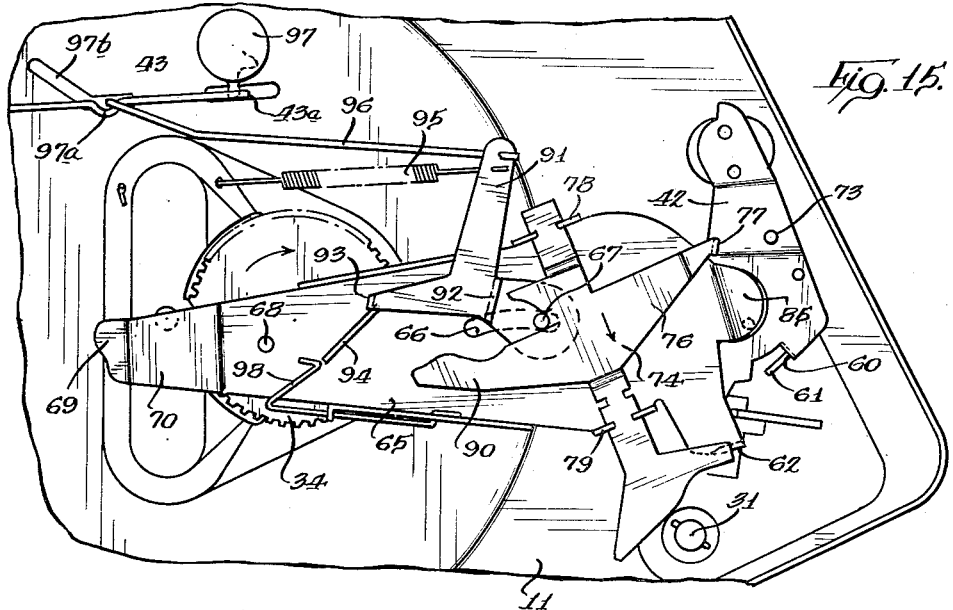
FIG. 15 is a view similar to FIG. 13 showing the parts positioned immediately prior to operation of the power switch for the changer in a last record shut off cycle.

In a normal cycle, the pivot arm 91 stays to the right of the ramp flange 94 on the operating member 65, as viewed in FIG. 3, with this action being assured by a flexible spring 98, secured to the operating member 65, which yields to permit the end 93 of the pivot arm to move to the other side of the ramp flange in the last record shut off operation, as shown in FIG. 13.

An alternate form of last record shut off mechanism is shown in FIG. 17, in which the cross slide 74 has added length, as indicated at 100. When the hold down shaft 31 is positioned to effect last record shut off, the end 100 of the cross slide is moved to have a tab 102 on the cross slide engage with a tab 103 on a reject lever 101 which shifts the reject lever 101 to the left, as viewed in the figure, and causes a tab 104 to engage the power switch 97 and turn off the motor. The reject lever 101 is movably mounted on a motorboard tab 105 by a slot 106. The lever has an end 107 for engagement by the handle 18 and an extension 108 to effect a reject operation.

In operation, actuation of the velocity trip mechanism causes rotation of the drive gear 34 which, through the pin 68, causes movement of the operating member 65 in its outward path of movement with the surface 71 thereon driving the set down cam 42 outwardly by engagement with pin 73 and the cross slide 74 avoiding engagement with any parts. The operating member 65 then at the outermost limit of its movement has raised the tone arm and the end 69 is ready to operate the record eject lever 26 to shift the record off the spindle shelf 25. The operating member 65 then commences its inward path of movement to eject a record with the cross slide 74 having its cam surface 77 positioned to pick up the set down pin 73 and move the tone arm inwardly until the size-sensing member 55 engages a notch on the set down cam or, if it is a seven-inch record, the surfaces 58 and 59 engage with each other. In any of these instances, the sloped surface 77 cams off the set down cam pin 73 to permit retention of the tone arm in the desired position. Further movement of the operating member 65 causes the surface 80 on the cross slide to move the cross slide to its normal rest position. During final movement, the cam surface 62 on the operating member engages the size-sensing member 55 to reset it to its initial position.

In a last record shut off operation as previously described, the hold down shaft 31 causes initial shift of the cross slide 74 to locate the sloped surface 77 out of a position to subsequently engage the set down cam pin 73 so that the tone arm remains in its outer position with the cross slide also engaging the pivot arm 91 to cause pivoting thereof about the staked pin 67 to place an end of the arm 93 behind the ramp flange 94 on the operating member 65. Return movement of the operating member tautens the spring 95 to subsequently shut off the power switch 97. It will be seen that the rod 96 operated by the pivot arm is independent of the reject rod 43 by the selective engagement between these parts. Thus, handle 18 can be operated to move rod 43 in either a reject cycle direction or a power-on direction without connection to the rod 96.

I claim:

1. In a record changer, a motorboard, a tone arm movably mounted on said motorboard, a record spindle mechanism supported by said motorboard, and means for operating said tone arm and spindle mechanism through a record change cycle including a member movably mounted on the motorboard, and means for moving said member in a cycle along a closed circuit including an outward path and an inward path different from said outward path.

2. In a record changer, a motorboard, a tone arm movably mounted on said motorboard, a record spindle mechanism supported by said motorboard, and means for operating said tone arm and spindle mechanism through a record change cycle including a cyclically operable member, means for moving said member in a cycle along a closed circuit including an outward path and an inward path different from said outward path, and means movably mounting said member on s a i d motorboard for movement of a part thereof along a generally parabolic path to provide actuating engagement in one part of said path only.

3. In a record changer, a motorboard, a tone arm movably mounted on said motorboard, means for cycling said tone arm in a record change cycle comprising, an elongate cycle member, means mounting said member for pivotal and linear movement, powered means traveling in a circle connected to said cycle member for imparting movement thereto, a cam connected to said tone arm and having a pin affixed thereto, a cross-slide movably mounted on said cycle member and having a surface engageable with said pin to return said tone arm to a record play position, and a surface on said cycle member engageable with said pin to move the tone arm outwardly during placement of a record on the turntable, said cycle member being driven and movable in a generally parabolic path at one end to have said cross-slide surface move outwardly beyond said pin as the cycle member moves in the first part of the cycle and engage said pin as the cycle member moves in the last part of the cycle.

4. In a record changer, a motorboard, a tone arm movably mounted on said motorboard, means for cycling said tone arm in a record change cycle comprising, an elongate cycle member, means mounting said member for pivotal and linear movement, means connected to said cycle member for imparting movement thereto, a set down cam connected to said tone arm and having a pin affixed thereto, a cross-slide movably mounted on said cycle member and having a sloped surface engageable with said pin to return said tone arm to a record play position, a surface on said cycle member engageable with said pin to move the tone arm outwardly during placement of a record on the turntable, said cycle member being driven and movable in a generally parabolic path at one end to have said cross-slide surface move outwardly beyond said pin as the cycle member moves in the first part of the cycle and engages said pin as the cycle member moves in the last part of the cycle, means for detecting the size of a record to be played including a member positionable in the path of said set down cam to stop said cam, said cross-slide being movable to permit release of said sloped surface from said pin when the set down cam is stopped, and means for resetting said cross-slide near the end of a cycle.

5. In a record changer, a tone arm, a set down cam associated with said tone arm for movement therewith, a record size-sensing mechanism including a member positionable adjacent the set down cam to control movement of the tone arm in one direction by selective engagement with said set down cam, a main operating member movable relative to said set down cam and said positionable member and having means thereon selectively engageable with said set down cam and positionable member, and means for moving said operating member in two distinct paths of travel whereby a first outward path travels said means beyond the member and set down cam without intersecting therewith and a second inward path carries said means into engaging relation first with said set down cam and then said member.

6. In a record changer as defined in claim 5, in which said main operating member has a cross-slide movably mounted thereon with the means engageable with the set down cam being on said cross-slide, means responsive to the absence of further records to be played for shifting said cross-slide to avoid engagement with the set down cam.

7. A record changer as defined in claim 6 including a mechanism for turning off the changer responsive to shift of said cross-slide.

8. A record changer as defined in claim 7 in which said last-mentioned mechanism includes a trip lever, a ramp on the main operating member, a spring connected to said trip lever, and a selectively engageable trip rod, whereby engagement of the trip lever by said cross-slide positions the trip lever to engage said ramp and movement of the main operating member causes pivoting of the trip lever to tension said spring with movement of the trip lever off the ramp permitting the spring to shift said trip rod operatively connected to a shut-off switch.

9. A record changer as defined in claim 7 in which said last mentioned mechanism includes a movable link, a first means on said link selectively engageable with an on-off switch, a second means on said link engageable by said cross-slide when the latter is shifted whereby bodily movement of the cross-slide with the main operating member shifts said link to cause said means on the link to operate said switch.

10. A record changer as defined in claim 9 in which a manually operated member is operatively associated with said link to effect starting of the changer by shift of the link in one direction and a reject cycle by shift of the link in an opposite direction.

11. In a record changer as defined in claim 5 in which said tone arm has an innermost set-down position independent of said size-sensing mechanism, means defining said innermost position including selectively interengageable surfaces on said set down cam and said main operating member with movement of said main operating member along said second inward path first effecting engagement between said surfaces and subsequently effecting disengagement.

12. In a record changer as defined in claim 5 in which said main operating member has an auxiliary member mounted thereon with the means engageable with the set down cam being on said auxiliary member, said means including a sloped cam surface, means mounting said auxiliary member for movement to permit shift of said member as moved by the cam surface when the set down cam is stopped by said positionable member, and means for resetting said auxiliary member to an initial rest position during the last part of the movement of the main operating member in said second inward path.

13. In a record changer, a motorboard, a tone arm movably mounted on said motorboard, means for cycling said tone arm in a record change cycle comprising, an elongate cycle member, means mounting said member for pivotal and linear movement, means connected to said cycle member for imparting movement thereto, a set down cam member connected to said tone arm, a cross-slide member movably mounted on said cycle member, said cross-slide member and set down member having coacting surfaces to return said tone arm to a record play position, means on said cycle member engageable with said set down cam member to move the tone arm outwardly during placement of a record on the turntable, said cycle member being movable in a path at one end to have said coacting surfaces out of contact as the cycle member moves in the first part of the cycle and in engagement as the cycle member moves in the last part of the cycle.

14. In a record changer, a motorboard, a tone arm movably mounted on said motorboard, means for cycling said tone arm in a record change cycle comprising a main operating member, means mounting said member for pivotal and linear movement, a set down cam connected to said tone arm and having a pin thereon, a motion transmitter movably mounted on said member and having a cam surface engageable with said pin to return said tone arm to a record play position, said main operating member being driven and movable in a generally parabolic path at one end to have said cam surface move outwardly beyond said pin as the main operating member moves in the first part of the cycle and engage said pin as the main operating member moves in the last part of the cycle.

15. In a record changer, a movable main operating member, means for moving said operating member in two distinct paths of travel along a first outward path and a second different inward path, a cross-slide movably mounted on the main operating member with means responsive to the absence of further records to be played for shifting said cross-slide relative to the main operating member, and mechanism for turning off the changer responsive to shift of said cross-slide, including a movable link, a first means on said link selectively engageable with an on-off switch, a second means on said link engageable by said cross-slide when the latter is shifted whereby bodily movement of the cross-slide with the main operating member shifts said link to cause said means on the link to operate said switch.

16. A record changer as defined in claim 15 in which a manually operated member is operatively associated with said link to effect starting of the changer by shift of the link in one direction and a reject cycle by shift of the link in an opposite direction.

References Cited by the Examiner
UNITED STATES PATENTS

| | | | |
|---|---|---|---|
| 2,898,114 | 8/59 | Vistain | 274—10 |
| 2,950,921 | 8/60 | Guest | 274—10 |
| 2,987,320 | 6/61 | Krakulec | 274—10 |
| 3,033,576 | 5/62 | Bara | 274—10 |
| 3,066,941 | 12/62 | Van Antwerp | 274—10 |

FOREIGN PATENTS 641,881   5/62   Canada.

EVON C. BLUNK, *Primary Examiner.*
NORTON ANSHER, *Examiner.*